May 13, 1952  H. C. BURNHAM  2,596,098
LAWN MOWER SHARPENER
Filed April 10, 1951

INVENTOR.
HARRY C. BURNHAM
BY
McMorrow, Berman + Davidson
ATTORNEYS

Patented May 13, 1952

2,596,098

UNITED STATES PATENT OFFICE 2,596,098

LAWN MOWER SHARPENER

Harry C. Burnham, Portland, Oreg.

Application April 10, 1951, Serial No. 220,179

3 Claims. (Cl. 76—82.1)

This invention relates to a method and apparatus for sharpening lawn mower blades and to an improved lawn mower blade produced thereby.

It is among the objects of the invention to provide a new method for sharpening lawn mower blades whereby the blades are quickly and easily sharpened and each blade is provided with a longitudinally-extending, concave surface in its forward face adjacent and substantially parallel to its cutting edge to provide a more durable cutting edge on such a blade and to provide an improved sharpening tool for carrying out the above process and producing a lawn mower blade of the character indicated, which tool is of small size and simplified construction and can be easily applied to and reciprocably moved along a lawn mower blade to reduce a rounded edge on such a blade and restore the sharp cutting edge necessary to satisfactory operation, which will produce a shallow, rounded groove or depression in the forward face of the blade at the cutting edge thereof to give to the cutting edge portion of the blade a hollow ground formation, which includes a replaceable or interchangeable file or abrader and means for locking such file or abrader in position with any predetermined portion of its abrading surface presented for use, and which is strong and durable in construction, economical to manufacture, and easy to use.

Other objects and advantages will become apparent from a consideration of the following description and the appended claims in conjunction with the accompanying drawing, wherein:

Figure 1:
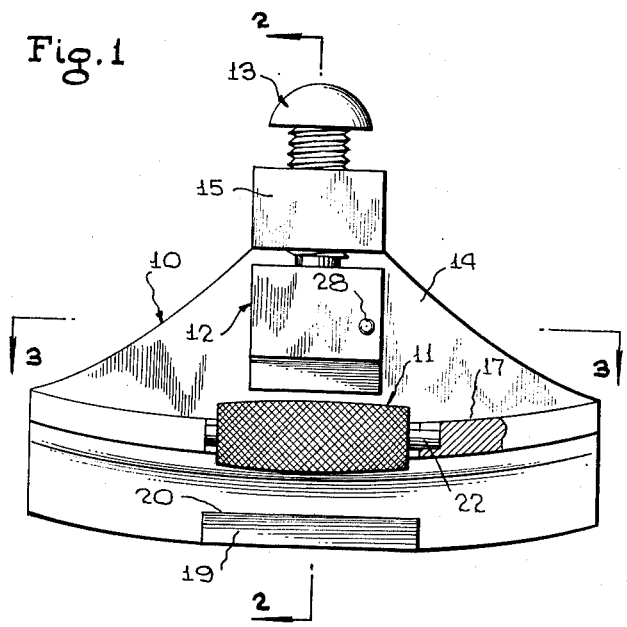
Figure 1 is a front elevation of a lawn mower sharpener, illustrative of the invention.

With continued reference to the drawing, the improved lawn mower sharpener comprises, in general, a frame 10, an abrader 11, a clamp block 12 for the abrader, and a set screw 13 threaded through a portion of the frame and carrying the clamp block 12.

The frame 10 comprises a flat back portion 14 shaped to provide a generally triangular portion imposed at its base on one edge of a generally rectangular portion. A lug 15 projects perpendicularly from the back portion 14 at the apex of the triangular formation, and is provided with an internally screw-threaded hole or aperture 16 extending therethrough. A rib 17 projects substantially perpendicularly from the back portion along said one edge of the rectangular formation of the back portion and is provided with a notch 18 of rectangular shape substantially symmetrical with the mid-length location of the rib, and a guide tongue 19 projects from the back portion at the opposite or outer edge of the rectangular formation and has a length substantially equal to the length of the notch 18 in the rib. This guide tongue is shaped to provide a substantially sharp bearing edge 20 directed toward the outer edge of the rib 17, and between the tongue 19 and the rib 17, the back portion is provided with a convex formation or bead 21 which also serves as a guide surface in cooperation with the bearing edge 20 of the guide tongue.

The abrader 11, as illustrated, is a file of generally cylindrical shape, but slightly tapered toward its opposite ends, and provided with a concentric, longitudinally-extending bore. This file 11 has a length slightly less than the length of the notch 18, and a shaft 22 extends through the bore of the file and is received at one end in a recess provided in the rib 17 at the corresponding end of the notch 18. As its opposite end, the shaft 20 is received in a socket 23 provided in the rib at the opposite side of the notch 18, the socket 23 being open at the side of the rib opposite the guide tongue 19, so that the file or abrader 11 can easily be removed from and assembled with the frame 10.

While the abrader has been illustrated as a file of generally cylindrical shape, it is to be understood that this abrader may be provided as a stone of abrasive material, as a core having a coating of abrasive material thereon, or as a smooth body of hard material for lapping an abrasive compound against a mower blade, and may be of rectangular or polygonal, as well as circular cross-sectional shape, without in any way exceeding the scope of the invention.

The clamp block 12 is of rectangular shape and has therein a T-shaped recess 24 opening to the top surface and one end surface of the block. The screw 13 has an externally screw-threaded portion 25 threaded through the lug 15 and has, on one end, a cylindrical head 26 received in the larger part of the T-shaped recess 24. Between the head 26 and the screw-threaded portion 25 the screw has a smooth, reduced shank 27 received in the smaller or narrower portion of the recess 24, so that the block 12 is firmly attached to the screw 13 by the cylindrical head 26. The block is held against separation from the screw by a locking pin 28 which extends transversely through the block near the end of the block to which the recess 24 opens. On its end opposite the head 26, the screw may be provided with any conventional form of screw head 29 to facilitate threading the screw through the lug 15.

In its lower side, the block 12 is provided with a V-shaped groove 30 of a size to firmly engage the upper portion of the abrader 11, and is provided with bevelled edges 31 and 32 at respectively-opposite sides of the groove 30.

It will be noted that the rib 17 is slightly curved longitudinally, this curvature being substantially the same as the curvature of the reel blades of a lawn mower.

Figure 2:
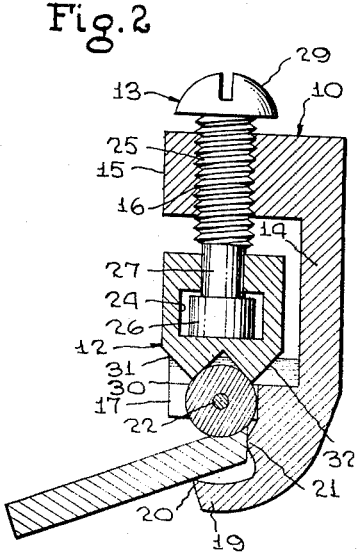
Figure 2 is a cross-section on the line 2—2 of Figure 1 with the parts in a somewhat different operative position from that illustrated in Figure 1.
Figure 3:
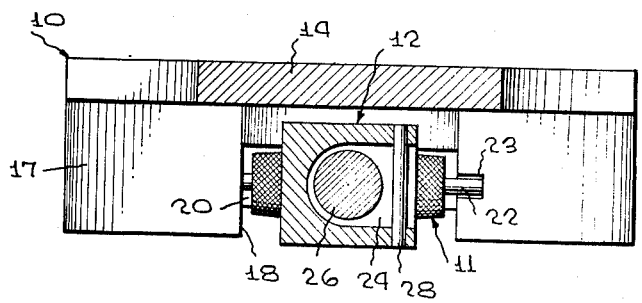
Figure 3 is a cross-section on the line 3—3 of Figure 1.

In using the sharpener, the reel structure of a lawn mower may be removed from the mower and clamped in a suitable vise. The sharpener is then operatively engaged with one of the reel blades by inserting the cutting edge of the reel blade between the abrader 11 and the guide tongue 19, assuming that the clamp block 12 is in firm engagement with the abrader. The blade is an elongated member of elongated, rectangular, cross-sectional shape having one edge beveled to provide a cutting edge, and the sharpener is tilted until the abrader bears firmly on the forward side of the blade at the cutting edge of the latter and is then manually moved back-and-forth longitudinally of the blade substantially parallel to the cutting edge until the rounded edge portion of the blade has been removed and the cutting edge restored, as particularly illustrated in Figure 2. By using an abrader of substantially circular cross-sectional shape the tool will produce a shallow, rounded groove or recess in the blade at the cutting edge of the latter, thus giving the blade a hollow-ground formation which greatly increases the useful life of the cutting edges of the blades and also facilitates resharpening thereof.

If one portion of the abrader 11 becomes worn, so that the abrader does not operate efficiently, the screw 13 is loosened and the abrader turned to bring a new portion of its surface to abrading position, after which the screw 13 is tightened to force the clamp block 12 against the abrader and firmly hold the abrader in its new position. This may be continued until an abrader is completely expended, whereupon the one abrader may be removed by loosening the screw 13 and a new abrader placed on the shaft 20 and the shaft receded in the rib 17. It is also possible to use abraders of different coarseness to provide rapid cutting at the beginning of the sharpening operation, and finer cutting near the end of such operation to provide a cutting edge of maximum sharpness.

The abrader may be also used in the same general manner to sharpen the straight or bottom blade of the mower.

The frame 10 and the clamp block 12 may be formed of any suitable material, such as steel, aluminum or brass, the screw 13 and shaft 22 are preferably formed of suitable steel, while the abrader 11 may be formed of specially hardened steel or of a suitable abrasive compound.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hand tool for sharpening a lawn mower blade having parallel faces and a beveled edge comprising a frame including a first portion of substantially triangular shape and a second portion of substantially rectangular shape extending along the base edge of said portion of triangular shape, a rib projecting from one side of said frame along the base edge of said first portion and having an elongated notch intermediate its length, an elongated abrader of substantially circular cross-sectional shape disposed in said notch and supported at its ends on said rib at the ends of said notch, said abrader being adapted to engage one face of an associated blade adjacent the beveled edge of the latter and provide in the face of the blade engaged thereby a shallow groove of rounded cross-sectional shape terminating laterally at the beveled edge of the blade, a tongue extending from said one side of the frame along the edge of said second portion remote from said first portion and terminating outwardly in a bearing edge adapted to engage the face of an associated blade opposite the blade face engaged by said abrader in opposition to the latter, a flat bead on said one side of said frame between said abrader and said tongue adapted to engage the beveled edge of an associated blade and guide the tool along the edge of a blade, a clamp block disposed against said one side of the frame and engaging said abrader at the side of the latter remote from said tongue, and means connected between said frame and said clamp block releasably holding said clamp block in engagement with said abrader.

2. A hand tool for sharpening a lawn mower blade having parallel faces and a beveled edge comprising a frame including a first portion of substantially triangular shape and a second portion of substantially rectangular shape extending along the base edge of said portion of triangular shape, a rib projecting from one side of said frame along the base edge of said first portion and having an elongated notch intermediate its length, an elongated abrader of substantially circular cross-sectional shape disposed in said notch and supported at its ends on said rib at the ends of said notch, said abrader being adapted to engage one face of an associated blade adjacent the beveled edge of the latter and provide in the face of the blade engaged thereby a shallow groove of rounded cross-sectional shape terminating laterally at the beveled edge of the blade, a tongue extending from said one side of the frame along the edge of said second portion remote from said first portion and terminating outwardly in a bearing edge adapted to engage the face of an associated blade opposite the blade face engaged by said abrader in opposition to the latter, a flat bead on said one side of said frame between said abrader and said tongue adapted to engage the beveled edge of an associated blade and guide the tool along the edge of the latter, a clamp block disposed against said one side of the frame and engaging said abrader at the side of the latter remote from said tongue, a lug projecting from said one side of said frame at the side of said clamp block remote from said abrader and having a tapped hole extending therethrough and directed toward the adjacent side of said clamp block, and a set screw threaded through the tapped hole in said lug and bearing at one end against said clamp block to force the latter against the adjacent side of said abrader.

3. A hand tool for sharpening a blade having substantially parallel faces and a beveled edge providing a cutting edge along the adjacent edge of one of said faces comprising a flat frame adapted to be moved back and forth along the beveled edge of an associated blade, an abrader of rounded cross-sectional shape carried by said frame in position to engage one face of an associated blade adjacent the cutting edge of the blade, a tongue projecting outwardly from said one side of said frame in a location spaced from said abrader and terminating outwardly of said frame in a bearing edge adapted to engage the face of an associated blade remote from said abrader in opposition to the latter, a guide bead on said one side of said frame between said abrader and said tongue adapted to engage the beveled edge of an associated blade and guide said frame therealong, and means carried by said frame and engaging said abrader at the side of the latter remote from said tongue for holding said abrader in engagement with the adjacent face of an associated blade to provide a groove along the cutting edge of the latter.

HARRY C. BURNHAM.

REFERENCES CITED

The following references are of record in the file of this patent:

UNITED STATES PATENTS

| Number | Name | Date |
| --- | --- | --- |
| 555,974 | Roberts et al. | Mar. 10, 1896 |
| 584,457 | Brown | June 15, 1897 |
| 765,492 | Knowlton | July 19, 1904 |
| 927,131 | Dow | July 6, 1909 |
| 1,263,666 | Hastings | Apr. 23, 1918 |
| 1,386,341 | Kansen | Aug. 2, 1921 |